May 24, 1960 W. BLAKE 2,937,914
TIME CODE GENERATOR FOR CAMERAS
Filed Oct. 3, 1955 2 Sheets-Sheet 1

INVENTOR.
WEBSTER BLAKE
BY
J. Edwin Coates
-ATTORNEY-

May 24, 1960 W. BLAKE 2,937,914
TIME CODE GENERATOR FOR CAMERAS
Filed Oct. 3, 1955 2 Sheets-Sheet 2

INVENTOR.
WEBSTER BLAKE
BY
Edwin Coates
-ATTORNEY-

United States Patent Office 2,937,914
Patented May 24, 1960

2,937,914

TIME CODE GENERATOR FOR CAMERAS

Webster Blake, Pacific Palisades, Calif., assignor to Douglas Aircraft Company, Inc., Santa Monica, Calif.

Filed Oct. 3, 1955, Ser. No. 537,990

6 Claims. (Cl. 346—107)

This invention relates to a motion picture or scoring camera adjunct for producing a time indicating signal on the camera film.

It is necessary in conjunction with certain applications or uses of scoring cameras that means are provided to make an accurate record of the time of occurrence of an event with respect to a datum. As for example, in the firing of an anti-aircraft missile carrying a warhead it is essential that the time lag between the transmission of the detonating signal to the warhead and the actual bursting of the warhead is known. When the duration of this period is known, the appropriate compensation can be integrated in the missile controlling computers to assure detonation of the missile at the optimum instant, i.e. when the missile is in the closest proximity to the target.

There are presently available several camera accessories that are capable of superimposing on the photographed image a positive time indication on each of successive frames of strip film. While these known devices are well suited for use when there are no space limitations, the more recent developments have space restrictions requiring a more compact unit. It is a prime feature of the present invention that there is provided a time indicating or code generating means which is simpler in construction, smaller in size and yet is as accurate, than the heretofore known arrangements.

This invention has a further advantage in that the time signal is not superimposed on the photographed image but rather is recorded on the marginal portion of the film which in general practice is unexposed. In this manner the possibility of obliterating the image is completely eliminated.

The advantages of the instant invention, in one form thereof, are accomplished by use of a pair of glow lamps each of which is optically imaged on one margin of movie film at the camera gate. These lamps are located behind the camera shutter and thus the film will be constantly exposed to the light emanating from either or both lamps when they are energized. By the employment of a switching arrangement the lamps are alternately lighted and produce patterns on the film margin which can be resolved into a relative time indication when the film speed through the camera is known. The film speed can of course be ascertained from the camera rating or, preferably, the lamp switching arrangement can produce lamp traces from which such speed can be accurately determined.

In the stead of the aforementioned dual lamp configuration, a single lamp having twin filaments operating under control of the same switching arrangement can also accomplish the purposes of this invention.

There are additional features and advantages associated with the present invention which will become apparent from an understanding of the following description and accompanying drawings in which.

Figure 1:
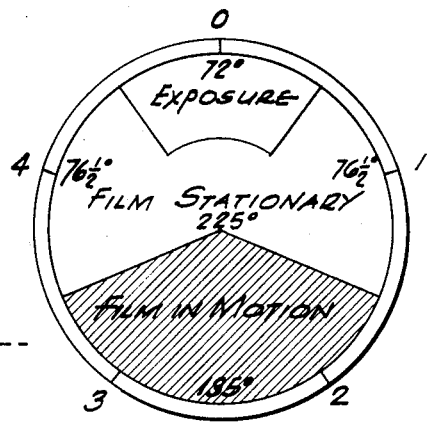
Figure 1 is a diagrammatic representation of a typical camera shutter condition and film travel for each film frame at the camera aperture.

In the diagram of Figure 1 it is indicated, as in the case of a typical camera, that each frame of a film strip is in motion for approximately two-fifths of a cycle and is stationary the remaining three-fifths of the cycle. During the stationary portion of the cycle and midway thereof the shutter is open and the frame is thereby exposed for about one-third of such cycle. Assuming a film speed of two-hundred frames per second (f.p.s.) each frame cycle would have a five millisecond duration consisting of periods of three, two and one milliseconds respectively during travel, non-travel and exposure.

Figure 2:
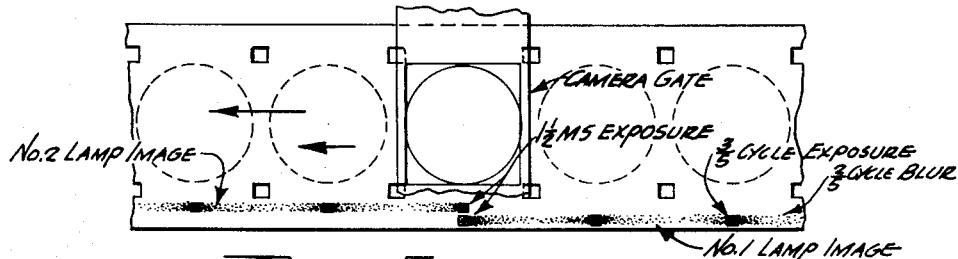
Figure 2 is a plan view of movie film having indications thereon showing the relative positions of the timing light images, camera gate and scoring camera image circle.
Figure 3:
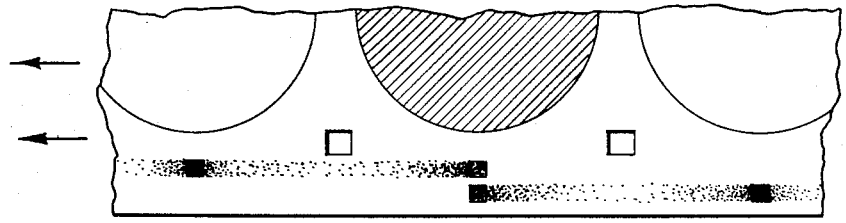
Figures 3 and 4 are fragmentary plan views of movie film depicting several patterns of twin filament timer lamp traces.
Figure 4:
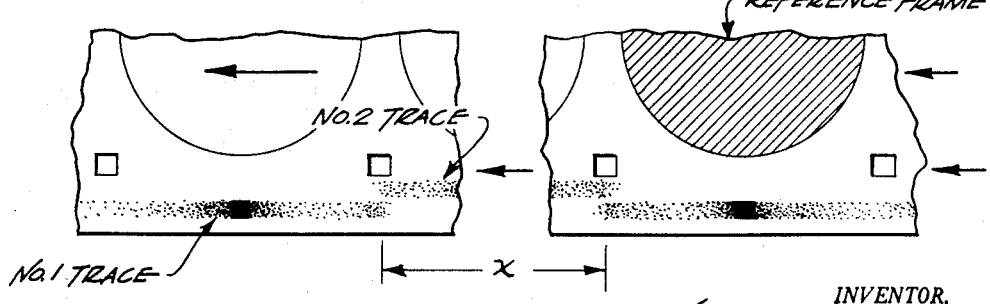

If two alternately energized glow lamps are oriented with respect to the film so that their images are focused at side-by-side points on the margin thereof with the film being constantly exposed to image of the energized lamp, a pattern, such as shown in each of Figures 2, 3 and 4, may be produced. During the film travel portion of the cycle, the lighted lamp will leave a blurred trace along the film margin and during stationary portion of the cycle a distinctive dark spot will appear as the result of the prolonged exposure. With particular reference to Figure 2, assuming one lamp is de-energized and the other simultaneously energized at the zero point in the frame cycle (Fig. 1), there will be produced at the respective end of one and beginning of the other lamp traces a clearly discernable spot having an intensity intermediate that of the ⅗ cycle exposure spot and the blur produced during the ⅖ motion cycle.

Through the utilization of the characteristics of the lamp traces and with the knowledge of the film speed, it is possible to determine the length of time lapse between the photographing of a scene on any one frame and the point of switch over from one to the second glow lamp. As set out above the film speed can be determined by making reference to the camera specification but preferably, by a timed switching from one lamp to the other and back to the one, the film speed can be readily calculated. As for example, viewing Fig. 4, if the duration of No. 2 lamp traces one-tenth second and the number of frames along distance x is five, then the film speed would be fifty frames per second. The advantage of the use of the lamp image to determine speed is that the record is permanently placed on the film. Furthermore, the comparison of actual film speed with the camera rated speed, as was frequently required prior to the inception of the present invention, is elminated.

To determine the time lag in the example use set out above, that is between the time of burst impulse emission to a missile and the actual burst of the missile, the camera is set in motion with the missile image in focus. By appropriate means, hereinafter more fully described, the burst impulse is used to also switch over from one lamp to the other. Upon switch over, a timer, preferably of the electronic type, is set into operation and at the end of the timer cycle the switch back to the first lamp is accomplished. By having the timed interval begin at the burst impulse, the exact speed of film travel at the time of missile burst can be recorded thereby negating any adverse effects of subsequent variations in camera speed. Such effects might be encountered if the camera speed were measured some time after the event. Assuming the foregoing operation produced the images and traces shown in Fig. 4, with the timer interval and $x$ distance indicating a 200 frame per second film speed, it will be seen that the switch over occurred at the mid-point in the motion portion of the frame cycle immediately preceding the exposure of the reference frame which indicates an approximate time lag of 2½ milliseconds. Having determined this time lag, the computing mechanism for actuating the burst impulse generator can be adjusted to compensate for such lag.

While all the foregoing could be accomplished by the use of a single glow lamp which is merely turned on and off, it is preferred that the two lamp system be employed because of its higher degree of reliability and also since the point of change over can be more readily discerned than can be the end of a single trace.

Figure 6:
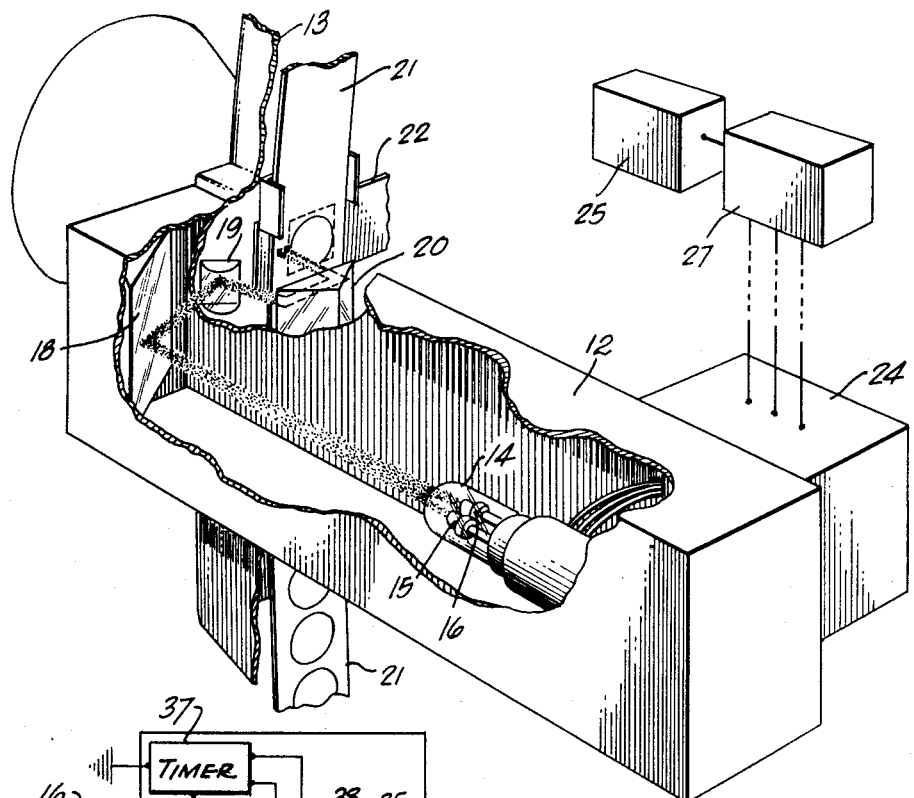
Figure 6 is a perspective view of the timer, parts being broken away, showing its position with respect to the camera film and further including timer control boxes.

In Figure 6 there is shown one specie of apparatus capable of producing traces on film such as those of Figures 2, 3 and 4. In this figure numeral 12 is a housing adapted to be attached to the side of a conventional scoring camera case 13. Within housing 12 and at one end thereof is a neon or argon, glow lamp 14, or the like, having twin filaments 15 and 16. At the opposite end of housing 12 is a prism or mirror 18 positioned to reflect the light from filaments 15 and 16 to second and third prisms or mirror 19 and 20 within the camera case 13 which in turn reflect the light onto the marginal edge of film strip 21. It is to be understood that the third prism or mirror 20 is behind and/or at one side of the camera shutter 22 so as to effect constant exposure of the film to the glow lamp 14.

The filaments 15 and 16 of glow lamp 14 are successively energized through a controlling switch arrangement (Fig. 6) located within casement 24. The switch arrangement being remotely controlled by computer 25 influencing signal emitter or generator 27.

Figure 7:
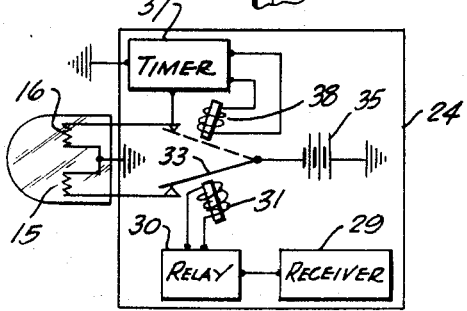
Figure 7 is a diagrammatic representation of switching system for the timer lamps or filaments.

One form of switch for alternately lighting filaments 15 and 16 is shown in Fig. 7. In this form, a receiver 29, responsive to the signal of emitter 27, governs relay 30 which in turn actuates solenoid 31 to throw switch blade 33 from full line position to dotted line position. By effecting this throw of blade 33 filament 15 is disconnected from battery 35 and filament 16 is energized. Simultaneously with the lighting of filament 16, power flow to timer 37 is effected. The details of the timer 37 forms no part of the present invention and any of several known types, such as that shown in U.S. Patent No. 2,545,257, can be used. At the end of the preselected timer interval, such as one-tenth of a second as used in the above examples, the solenoid 38 is actuated to return blade 33 to full line position. By the adoption of this system, or other having like operating characteristics, the mechanism is self resetting and can thus be used to record several successive events without intervening manipulation.

Figure 5:
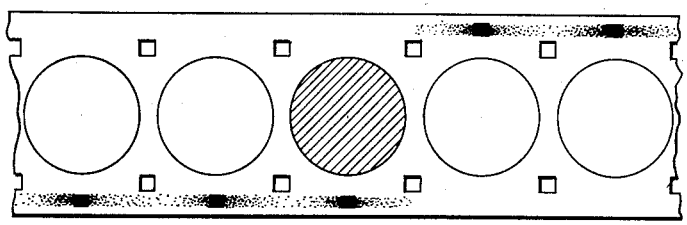
Figure 5 is a fragmentary plan view of film similar to those of Figures 3 and 4 but showing the traces of a pair of timer lamps.

While the foregoing embodiment of timer light and prism organization is preferred, it is contemplated that the light emitted from the twin lamp filaments can, by suitable optics, be transmitted to opposite film margins so as to produce traces such as shown in Figure 5. Still a further form of the invention could employ a pair of lights, under the control of a common switch, each of which being mounted on the respective opposite side of the camera case, and each of which having a separate optic system.

While the foregoing invention has been described with respect to specific embodiments thereof it is to be understood that it is susceptible to changes in form and character and is to be limited only by the scope of the appended claims.

I claim:

1. In combination with a motion picture camera; a film strip having a series of frames thereon, the strip being fed through the camera at a substantially constant average rate of speed; a pair of alternately energized light generating means, the images of said pair of means being focused in side-by-side relation on a marginal edge of the film strip with the film strip being constantly exposed to light emitted by said means; means for selectively interrupting the emission of light from one of said pair and simultaneously energizing the other of said pair as the film strip is fed through said camera whereby to produce a pair of parallel traces along said margin with one of said traces terminating at the beginning of the other of said traces; and means for resuming after a predetermined time the emission of light from the one of said pair and simultaneously deenergizing the other of said pair whereby a series of traces is produced on the film from which the speed of the film strip can be determined and whereby the time lapse between the operation of said means for selectively interrupting and any of said series of frames can be determined.

2. In combination with a motion picture camera; a film strip having a series of frames thereon, the strip being fed through the camera at a substantially constant known average rate of speed; a pair of alternately energized light generating means, the images of said pair of means being focused in side-by-side relation on a marginal edge of the film strip with the film strip being constantly exposed to light emitted by said means; means for interrupting the emission of light from one of said pair at any desired time and simultaneously energizing the other of said pair as the film strip is fed through said camera whereby to produce a pair of parallel traces along said margin with one of said traces terminating at the beginning of the other of said traces, the point at which the one of said traces terminates and the other of said traces begins forming a distinct datum from which the time lapse between the datum and any of said frames can be determined; and means for controlling the operation of said interrupting means and being actuated by a remotely emitted radiant energy signal.

3. The combination as defined in claim 1 wherein the means for resuming is a timer having a cycle of operation which is initiated upon the operation of said means for interrupting the emission of light.

4. In combination, a motion picture camera; a film strip having a series of frames thereon, said strip being fed through said camera at a substantially constant average rate of speed; first light generating means proximate said camera with the light therefrom being focused at a first point on a marginal portion of said film strip, second light generating means with the light therefrom being focused at a second point on a marginal portion of said film, said first and second points being laterally spaced from each other and said strip being continuously exposed to any light emitted from either and both light generating means; and said first and second light generating means being alternately energized and selectively operated means de-energizing one of said light generating means and simultaneously energizing the other of said light generating means whereby a pair of parallel traces is produced on the film with one of said traces terminating at the beginning of the other of said traces, said selectively operated means including means to reenergize said one of said light generating means after the expiration of a predetermined time interval.

5. In combination with a motion picture camera; a film strip comprising a continuous series of frames and passing through the camera at a substantially constant average rate of speed; two light sources adapted to have the images thereof impressed at points in side-by-side relation on a margin of the film whereby each of said sources, when energized, will produce a line exposure on the film margin when the film is in motion; means for simultaneously energizing one of said sources and deenergizing the other of said sources; and means operative a predetermined time after operation of the first said means to simultaneously reestablish energization of said one of said sources and deenergize the other of said sources.

6. The combination defined in claim 5 wherein the first of said means is operated at the occurrence of a selected event and wherein the second of said means includes a single cycle timer which cycle is initiated upon operation of the first of said means whereby the length of the line exposure effected by the other of said sources is a function of the film speed and the distance from the termination of the line exposure of said one of said sources to each of said frames is a function of the elapsed time between exposure of each frame and the occurrence of the selected event.

References Cited in the file of this patent

UNITED STATES PATENTS

| | | |
|---|---|---|
| 2,458,882 | Stoner | Jan. 11, 1949 |
| 2,496,392 | Hasbrook | Feb. 7, 1950 |
| 2,614,468 | Newcomb et al. | Oct. 21, 1952 |
| 2,646,334 | Marchand | July 21, 1953 |
| 2,649,016 | Fairbanks | Aug. 18, 1953 |
| 2,707,524 | Montgomery | May 3, 1955 |
| 2,746,549 | Roth | May 22, 1956 |
| 2,746,833 | Jackson | May 22, 1956 |